(12) United States Patent
Harkins et al.

(10) Patent No.: US 6,860,011 B2
(45) Date of Patent: Mar. 1, 2005

(54) METHOD FOR ATTACHING AN AIR DUCT TO A RECUPERATOR CORE

(75) Inventors: Bruce David Harkins, Clear Lake Shores, TX (US); Jan Szymon Illakowicz, Spring, TX (US)

(73) Assignee: Solar Turbines Inc., San Diego, CA (US)

(*) Notice: Subject to any disclaimer, the term of this patent is extended or adjusted under 35 U.S.C. 154(b) by 368 days.

(21) Appl. No.: 10/107,489

(22) Filed: Mar. 28, 2002

(65) Prior Publication Data

US 2003/0182785 A1 Oct. 2, 2003

(51) Int. Cl.[7] .............................. B23P 15/26; F28F 3/00
(52) U.S. Cl. .............................. 29/890.034; 29/890.03; 29/428; 29/726; 165/166; 165/170
(58) Field of Search .................. 29/890.034, 890.03, 29/428, 726; 165/166, 170

(56) References Cited

U.S. PATENT DOCUMENTS

| | | |
|---|---|---|
| 5,555,933 A | 9/1996 | Darragh et al. |
| 6,158,121 A | 12/2000 | Ervin et al. |
| 6,267,176 B1 * | 7/2001 | Bolla et al. ............ 165/166 |

* cited by examiner

Primary Examiner—Marc Jimenez
(74) Attorney, Agent, or Firm—Finnegan, Henderson, Farabow, Garrett & Dunner

(57) ABSTRACT

A method of attaching an air duct to a recuperator core may include welding a pair of butterpasses along a length of each of a plurality of core portions, connecting the plurality of core portions to one another to form the recuperator core and a pair of butterpasses extending along a length of the recuperator core, and attaching the air duct to the recuperator core along at least a portion of the pair of butterpasses. The method may also include controllably moving a welding torch into the air duct and along substantially the length of the recuperator core and controllably welding each butterpass to the air duct along substantially the length of the recuperator core without adding metal to the weld.

14 Claims, 6 Drawing Sheets

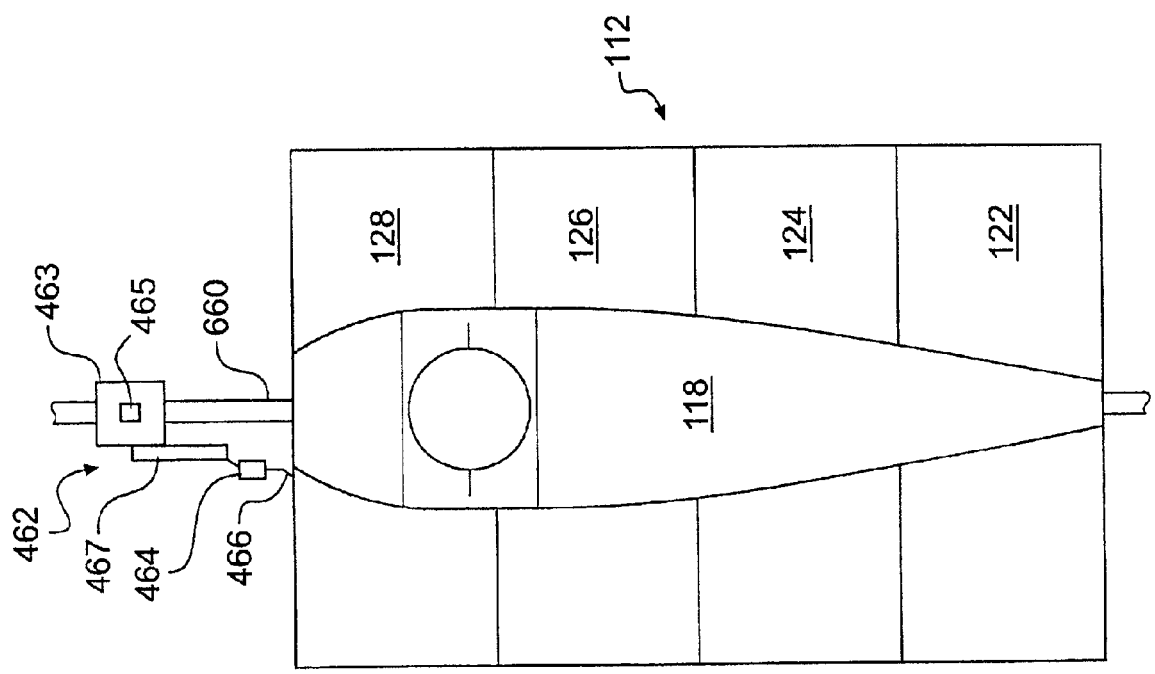

METHOD FOR ATTACHING AN AIR DUCT TO A RECUPERATOR CORE

TECHNICAL FIELD

The present invention relates to a recuperator for use with a gas turbine engine and, more particularly, to a method for attaching an air duct to a recuperator core.

BACKGROUND

Many gas turbine engines use a heat exchanger, or recuperator, to increase the operation efficiency of the engine by extracting heat from the exhaust gas and preheating intake air. Typically, a recuperator for a gas turbine engine must be capable of operating at temperatures of between about 500° C. (932° F.) and 700° C. (1292° F.) and internal pressures of between approximately 450 kPa (65.267 psi) and 1400 kPa (203.053 psi) under operating conditions involving repeated starting and stopping.

Generally, recuperators receive compressed, discharged air from a compressor of the engine at opposite sides of a recuperator core. The air flows through air cells towards an air-out duct located between the opposite sides of the recuperator core. Meanwhile, hot exhaust gas flows through exhaust cells that alternate with the air cells and conductively heats the compressed, discharged air.

In some conventional recuperators, the air-out duct is installed in three pieces. First, two wings are welded to the recuperator core. Then, a cap piece is welded to each of the two wings. As a result, the air-out ducts on these conventional recuperators include at least four welds along the entire length of the recuperator core. When exposed to the extreme heat of a recuperator, the welds shrink. This distortion increases stress levels at the air-out duct welds, often resulting in premature failure of the welds, and thus the air-out duct.

In addition, in some conventional recuperators, the air-out duct is placed and welded free-hand, resulting in inexact placement of the duct and poor quality welds. Again, these welds often fail prematurely. These premature failures are of great concern because recuperators are costly to manufacture and not easy to repair once placed in the field. Accordingly, the present invention seeks to address one or more of the above problems by minimizing the number of and improving the quality of welds at the air-out duct of a recuperator.

SUMMARY OF THE INVENTION

According to one exemplary aspect of the invention, a method of attaching an air duct to a recuperator core may include welding a pair of butterpasses along a length of each of a plurality of core portions, connecting the plurality of core portions to one another to form the recuperator core and a pair of butterpasses extending along a length of the recuperator core, and attaching the air duct to the recuperator core along at least a portion of the pair of butterpasses. The method may also include controllably moving a welding torch into the air duct and along substantially the length of the recuperator core and controllably welding each butterpass to the air duct along substantially the length of the recuperator core without adding metal to the weld.

According to another exemplary aspect of the invention, a recuperator for use with a gas turbine engine may include a recuperator core having a length, a pair of opposed side walls, and a bottom wall extending between the pair of opposed side walls. The recuperator may also include a longitudinal opening in the bottom wall extending substantially the length of the recuperator core between the pair of opposed side walls, at least one air inlet disposed at one of the pair of opposed side walls, a one-piece air duct associated with and extending substantially the length of the longitudinal opening, and a pair of welded connections between the one-piece air duct with the recuperator core along substantially the length of the recuperator core. Each of the pair of welded connections may include a butterpass weld extending substantially the length of the recuperator core welded to a respective free end of the air duct.

According to yet another aspect of the invention, an apparatus for attaching a one-piece air duct to a recuperator core may include a track, a welding device including a frame, and an extension arm extending from the frame in a direction substantially parallel with the track. The welding device may be movably mounted on the track. The apparatus may include a welding torch mounted on the extension arm, a grinder movably mounted on the track, and a controller configured to selectively move at least one of the welding device and the grinder along the track such that the selected one of the welding device and the grinder moves substantially a length of the recuperator core.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate several exemplary embodiments of the invention and, together with the description, serve to explain the principles of the invention. In the drawings.

FIG. 6 is a schematic and diagrammatic plan view of another exemplary recuperator in accordance with the invention.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1A:
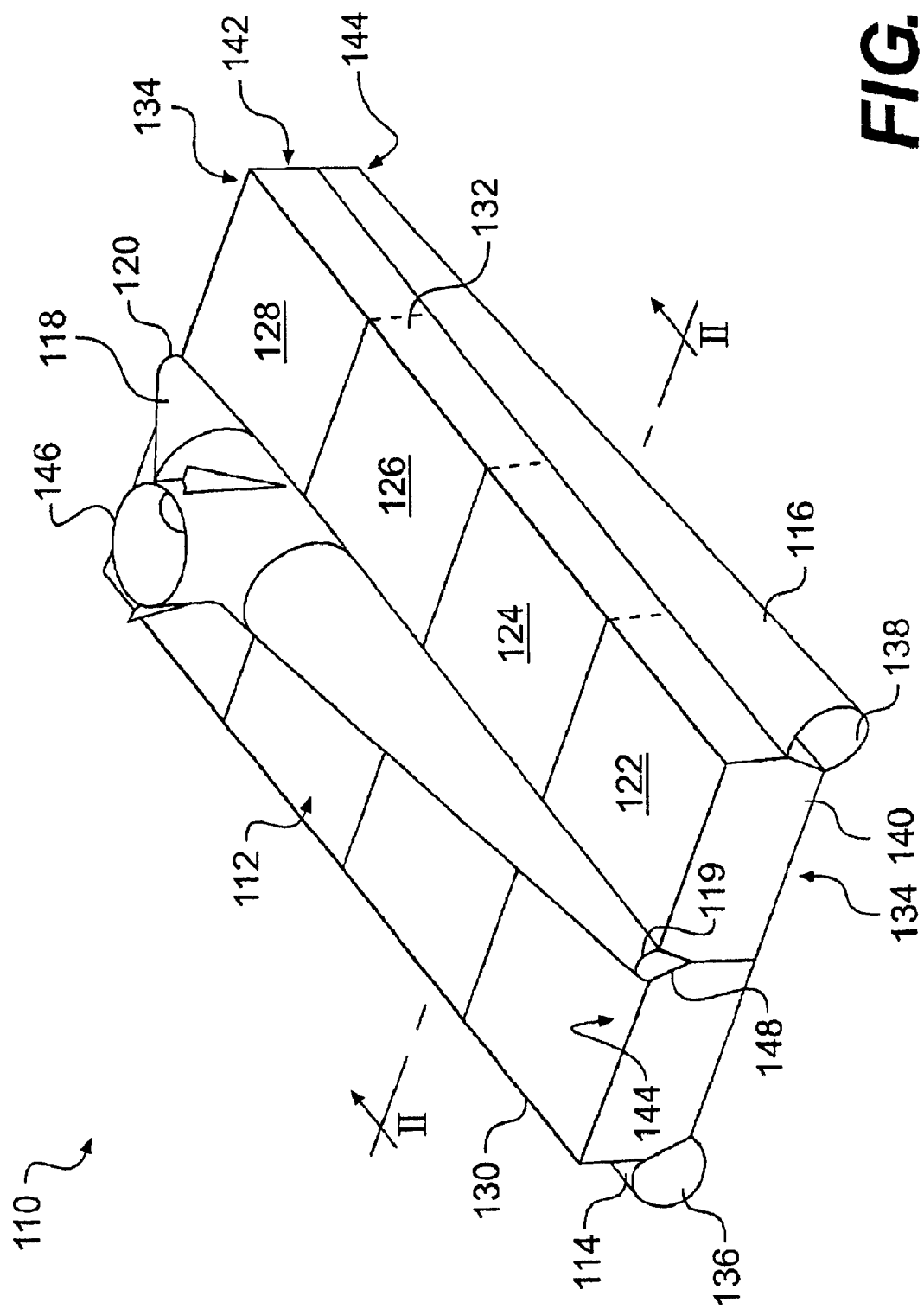
FIG. 1A is a perspective view of an exemplary recuperator in accordance with the invention.

Referring to FIG. 1A, an exemplary recuperator 110 is shown in an inverted orientation as compared to a typical operational orientation. The recuperator 110 may include a core 112, at least one inlet duct 114, 116, and an outlet duct 118. The core 112 may be assembled from a plurality of core portions; for example, as shown in the exemplary embodiment of FIG. 1A, the core 112 may be formed of four quarter-core portions 122, 124, 126, 128 attached together, for example, by welding. It should be appreciated that core 112 may include more or less than four core portions, or the core 112 may constitute a single portion.

The inlet ducts 114, 116 may be positioned at opposite, lateral sides 130, 132 and at a top side 134 of the core 112. Each inlet duct 114, 116 may have an inlet opening 136, 138, respectively, at a first end 140 of the core 112 and extend substantially the length of the core 112. The inlet ducts 114, 116 may taper from the inlet openings 136, 138 to a second end 142 of the core 112.

The outlet duct 118 may be positioned at a bottom side 144 of the core 112 and be substantially centrally located between the lateral sides 130, 132. The outlet duct 118 may include an outlet opening 146 disposed between the first end 140 and the second end 142 of the core 112 and facing away from the bottom side 144 of the core 112. The outlet duct 118 may taper from the outlet opening 146 to the first end 140 and from the outlet opening 146 to the second end.

Figure 1B:
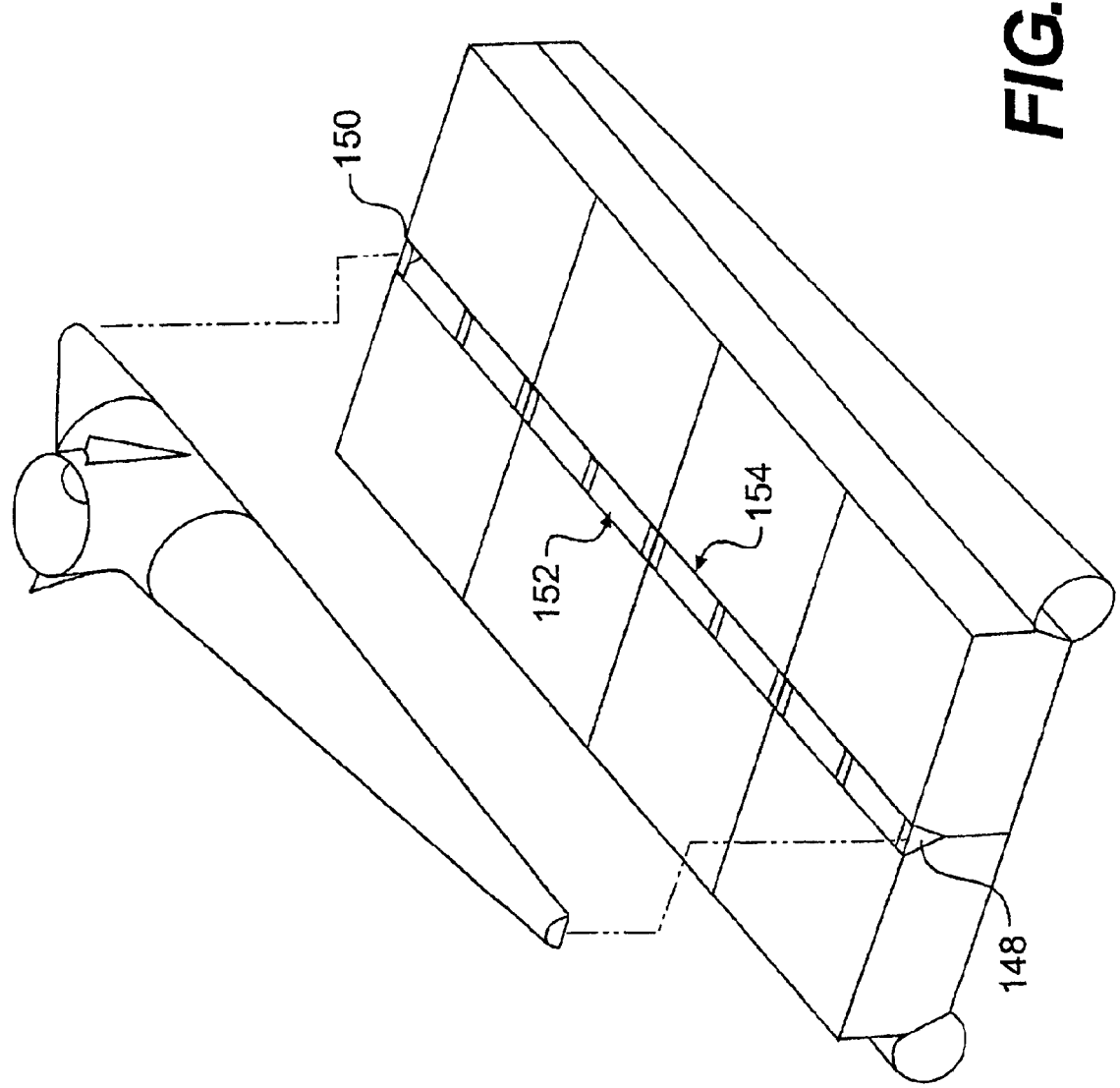
FIG. 1B is an exploded view of the exemplary recuperator shown in FIG. 1A.
Figure 2:
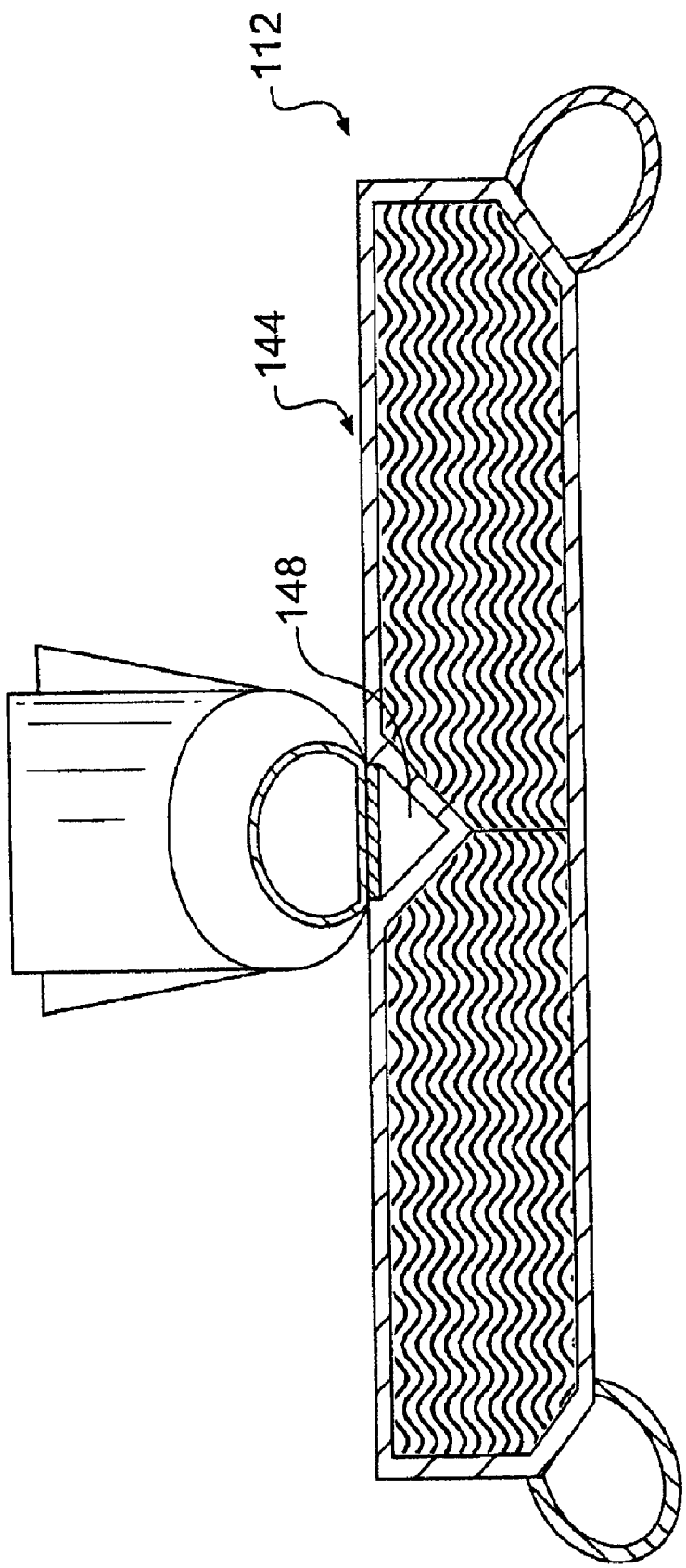
FIG. 2 is a cross-sectional view of the exemplary recuperator taken along line II—II in FIG. 1A.

As shown in FIGS. 1A, 1B, and 2, the outlet duct 118 may cover a longitudinal opening 148 in the bottom side 144 of the core 112. The width of the longitudinal opening 148 may be substantially constant along the length of the core 112. A ladder 150 may be attached to sides 152, 154 of the longitudinal opening 148, for example, by welding. The ladder 150 may provide a structural connection between the sides 152, 154 while allowing air to flow from inside the core 112 into the outlet duct 118.

Referring to FIG. 2, the longitudinal opening 148 may have a v-shaped cross-section when viewing the recuperator 110 in an inverted orientation. The ladder 150 may be in the opening 148 and attached to the sides 152, 154 toward the bottom side 144 of the core 112.

Figure 3:
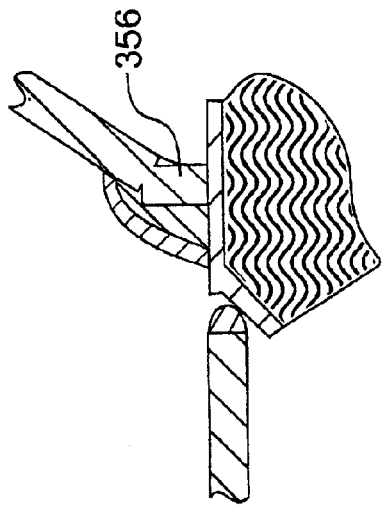
FIG. 3 is a partial, enlarged view of a portion of the cross-section shown in FIG. 2.
Figure 4:
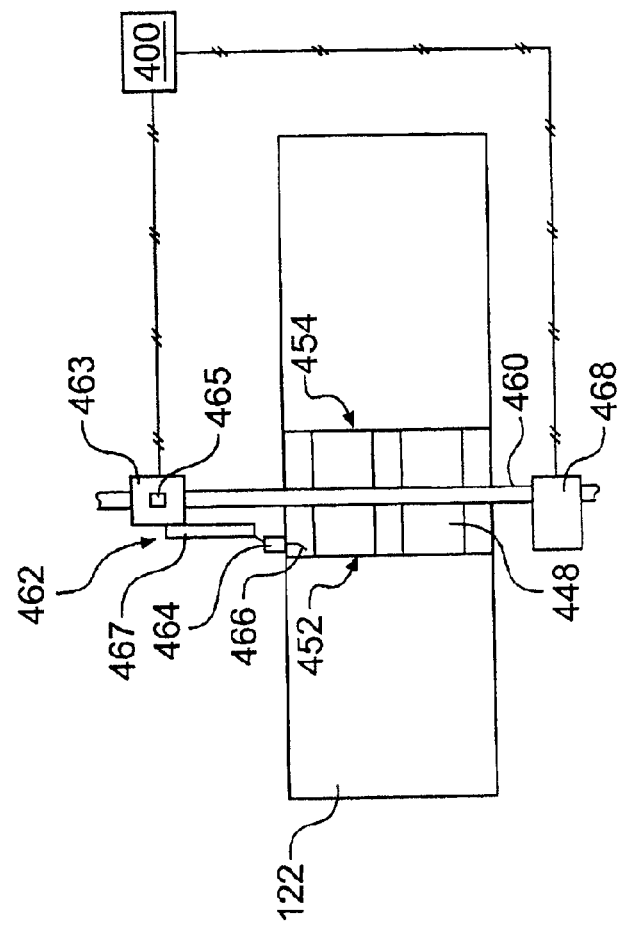
FIG. 4 is a schematic and diagrammatic plan view of an exemplary core portion of the recuperator in accordance with the invention.

FIG. 3 shows an enlarged view of a portion of the recuperator 110 at the right side 154 of the longitudinal opening 148. A ridge 356 may extend outward from the bottom side 144 of the core 112. The ridge 356 maybe positioned laterally outward (i.e., to the right as viewed in FIGS. 2 and 3) from the right side 154 of the longitudinal opening 148. The outlet duct 118 may be attached to the core 112 at the ridge 356, for example, by welding. It should be appreciated that a similar ridge (not shown) may extend outward from the bottom side 144 of the core 112 at a position laterally outward (i.e., to the left as viewed in FIG. 2) from the left side 152 of the longitudinal opening 148.

Referring now to FIGS. 4–7, an exemplary apparatus and method for attaching the outlet duct 118 to the core 112 of the recuperator 110 are described with respect to one of the plurality of core portions 122, 124, 126, 128. It should be appreciated that each of the core portions 122, 124, 126, 128 may be separately manufactured and/or assembled in a manner similar to that being described below with respect to the core portion 122. A track 460 may be positioned at the longitudinal opening 448 of the core portion 122. A welding device 462 may be movably mounted on the track 460. The welding device 462 may include, for example, a frame 463 and a cool-wire feed unit 464 associated with a welding torch 466. The welding torch 462 may be mounted on an extension arm 467 that extends from the frame 463. The welding device 462 may also include an oscillator 465 that may oscillate the welding torch 462 in a plane substantially perpendicular to the extension arm 467.

Figure 5:
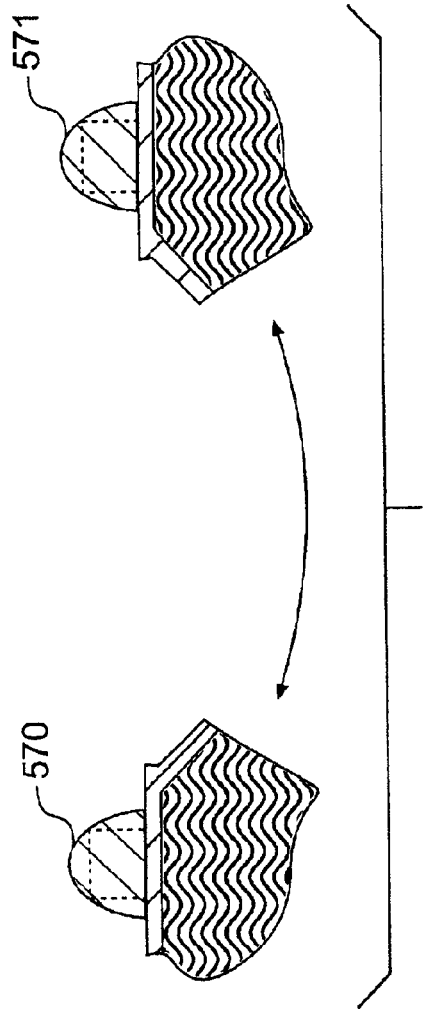
FIG. 5 is the portion of the cross-section of FIG. 3 shown prior to attachment of an outlet duct.

The welding device 462 may be in electrical communication with a controller 400. The controller 400 may controllably move the welding device 462 along the track 460 while controlling operation of the welding device 462 to weld a butterpass 570 laterally outward of one side 152 of the longitudinal opening 448, as shown in FIG. 5. Another butterpass 571 may be welded laterally outward of the opposing side 154 of the longitudinal opening 448. The butterpasses 570, 571 may be welded substantially parallel with the track 460 along substantially the length of the longitudinal opening 448 of the core portion 122. The butterpasses 570, 571 may have a rounded profile, as shown in FIG. 5. This procedure for welding a pair of butterpasses 570, 571 may be repeated for each of the plurality of core portions 122, 124, 126, 128.

A grinder 468 may be movably mounted on the track 460. The grinder 468 may include, for example, a rotatable grinding blade (not shown). The grinder 468 may be in electrical communication with the controller 400. The controller 400 may controllably move the grinder 468 along the track 460 while controlling operation of the grinder 468 to grind the top of each butterpass 570, 571 so that each butterpass is substantially flat along substantially the length of the longitudinal opening 448 of the core portion 122, as shown by the dotted line in FIG. 5.

The grinder 468 may include a guide to ensure that each butterpass 570, 571 is ground to a substantially-constant flattened height along its length. Any low points in the flattened butterpasses may be filled in by manual welding or by controllable operation of the welding device 462. The filled-in low points may be re-ground with the grinder 468 or by manually grinding. This procedure for flattening the butterpasses 570, 571 may be repeated for each of the plurality of core portions 122, 124, 126, 128.

It should be appreciated that the butterpasses of a first core portion may be welded and flattened before welding a butterpass on a subsequent core portion. It should further be appreciated that the welding device 462 and grinder 468 may be subsequently mounted on the same track 460 or may be mounted on separate tracks (not shown).

When mounted on each of the plurality of core portions 122, 124, 126, 128, the track 460 is positioned at substantially the same location with respect to the sides 452, 454 of the longitudinal opening 448. Consequently, the butterpasses 570, 571 are positioned at substantially the same location with respect to the sides 452, 454 of the longitudinal opening 448.

By way of example only, if an operator desires the ground-down dimensions of the butterpass to be $3/16$" high by $3/16$" wide, the welding device 462 may be controllably operated to weld an initial butterpass having greater height and width dimensions. Then, using a $3/16$" height guide, the grinder 468 may grind the top of the butterpass to a $3/16$" height. When grinding the sides of the butterpass, the grinder 468 may be aligned to grind a first side of the butterpass flat and then re-aligned to a position shifted laterally by $3/16$" to grind the opposite side of the butterpass flat. The ground-down sides of the butterpass are shown by dotted lines in FIG. 5.

Referring to FIG. 6, the plurality of core portions 122, 124, 126, 128 are arranged such that the butterpasses 570, 571 of each core portion 122, 124, 126, 128 are aligned end-to-end to form a pair of butterpasses 770, 771 along substantially the length of the core 112 and such that the longitudinal opening 148 is formed. The core portions 122, 124, 126, 128 may be attached to one another, for example, by welding, to form the core 112 of the recuperator 110.

A track 660 may be positioned at the longitudinal opening 148 of the core 112. The track 660 may be the same track 460 positioned at the longitudinal opening 448 of each core portion 122, 124, 126, 128, provided the track can guide the grinder 468 along substantially the length of the core 112. The grinder 468 may be movably mounted on the track 660, and the controller 400 may controllably move the grinder 468 along the track 660 while controlling operation of the grinder 468 to grind both sides of each butterpass 770, 771 so that both sides of each butterpass 770, 771 are substantially flat along substantially the length of the longitudinal opening 148, as shown in dashed lines in FIG. 5.

The outlet duct 118, for example, a one-piece outlet duct, may be positioned such that each free edge 780, 782 of the outlet duct 118 contacts a respective butterpass 770, 771 along at least a portion of the length of the longitudinal opening 148. The shortest distance between the free edges 780, 782 of the outlet duct may be substantially the same as, but slightly less than, the distance between the outwardly facing sides 784, 786 of the butterpasses 770, 771 such that the free edges 780, 782 may engage the butterpasses 770, 771 in a slightly resilient relationship. The outlet duct 118 may also be longitudinally positioned such that its first and second ends 119, 120 are aligned with the first and second ends 140, 142 of the core 112, respectively. The outlet duct 118 may be tacked to the butterpasses 770, 771, for example, by spot-welding, along the length of the core 112.

Figure 7:
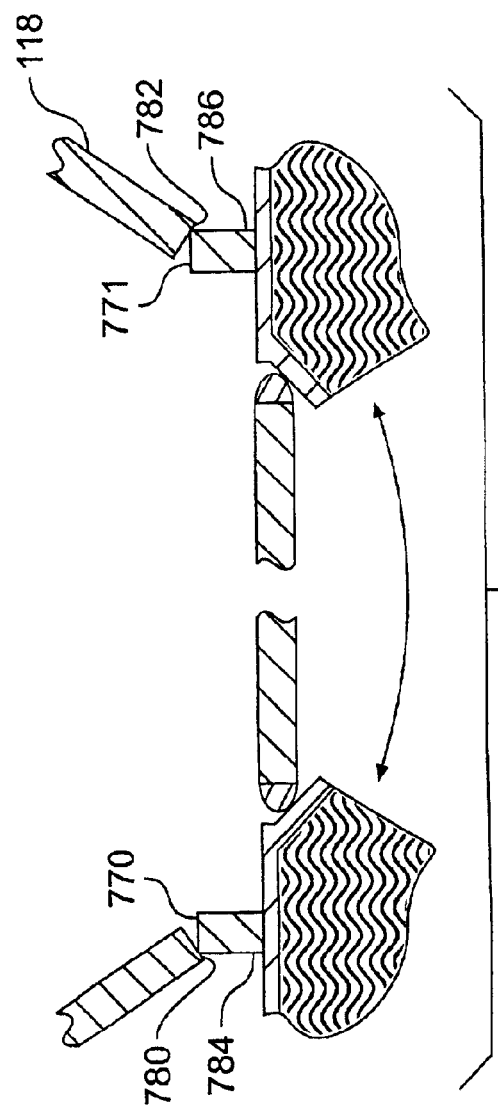
FIG. 7 is the portion of the cross-section of FIG. 3 shown during attachment of an outlet duct.

The welding device 462 may be movably mounted on the track 660. The track 660 may be the same track 460 positioned at the longitudinal opening 448 of each core portion 122, 124, 126, 128, provided the track can guide the welding device into one of the ends 119, 120 of the outlet duct 118. The controller 400 may controllably move the welding device 462 along the track 660 inside the outlet duct 118, enabling the welding torch 466 to weld the joint between the outlet duct 118 and the core 112 along the substantially entire length of the longitudinal opening 148. The controller 400 may controllably operate the welding device 462 to weld the connection between the free edges 680, 682 of the outlet duct 118 and the butterpasses 770, 771 without adding metal. The controller 400 may oscillate the welding torch 466 in a plane substantially perpendicular to the track 660 as the torch 466 is controllably moved along the length of the longitudinal opening 148 to weld one free edge 780 of the outlet duct 118 and the associated butterpass 770. The welding torch melts the butterpass 770 and a portion of the outlet duct 118 proximate the free edge 780 to provide a welded connection, as shown in FIG. 7. This procedure is repeated to provide a welded connection between the remaining butterpass 771 and free edge 782.

The controller 400 may controllably move the welding device 462 along the track 660 inside the outlet duct 118 and operate the welding device 462 to perform one or more additional welds at the connection between the free edges 780, 782 of the outlet duct 118 and the butterpasses 770, 771. In these additional welds, the cool-wire feed unit may add metal to build up the joint and to fill in any low spots. During these additional welds, the controller 400 may oscillate the welding torch 466 in a plane substantially perpendicular to the track 660 as the torch 466 is controllably moved along the length of the longitudinal opening 148 to weld the free edges 780, 782 of the outlet duct 118 and the butterpasses 770, 771. Welding, for example, spot-welding, may be performed at an exterior of the connection between the outlet duct 118 and the core 112 to clean up and/or build up the weld joint.

INDUSTRIAL APPLICABILITY

A plurality of core portions 122, 124, 126, 128 may be individually manufactured and assembled. A butterpass 570, 571 may be welded on each side of a substantially-central longitudinal opening 448 in the bottom side 144 of each of the core portions 122, 124, 126, 128. The top of each butterpass 570, 571 may be ground until substantially flat and a desired height from the bottom side 144.

The plurality of core portions 122, 124, 126, 128 may be welded to one another such that the longitudinal openings 448 form a longitudinal opening 148 along substantially the length of the core 112 and such that the pair of butterpasses 570, 571 of each core portion 122, 124, 126, 128 are aligned with respect to the butterpasses 570, 571 of the other core portions 122, 124, 126, 128. Each side of the resulting butterpasses 770, 771 may be ground until substantially flat and until the butterpasses 770, 771 are a desired width.

A pair of opposed, free edges 780, 782 of the outlet duct 118, for example, a one-piece air outlet duct, may be brought into contact with the flattened butterpasses 770, 771. The butterpasses 770, 771 may serve as a guide to improve the accuracy of the alignment of the outlet duct 118 with respect to the core 112. The free edges 780,782 of the outlet duct 118 maybe welded to the respective butterpasses 770, 771 inside the outlet duct 118 without adding metal during the weld. One or more additional welds adding metal may then be made inside the outlet duct 118 at the welded connection between the outlet duct 118 and the core 112. Additional welding at the exterior connection between the outlet duct 118 and the core 112 may be performed.

Thus, the present invention provides a method for attaching an air-out duct to a recuperator core that minimizes the number of and improves the quality of welds at the duct and improves the placement accuracy of the duct. Consequently, the recuperator may experience an extended lifespan, thereby reducing the operating costs for customers.

It will be apparent to those skilled in the art that various modifications and variations can be made in the disclosed recuperator without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A method of attaching an air duct to a recuperator core, comprising:
    welding a pair of butterpasses along a length of each of a plurality of core portions;
    connecting the plurality of core portions to one another to form the recuperator core and a pair of butterpasses extending along a length of the recuperator core;
    attaching the air duct to the recuperator core along at least a portion of the pair of butterpasses;
    controllably moving a welding torch into the air duct and along substantially the length of the recuperator core; and
    controllably welding each butterpass to the air duct along substantially the length of the recuperator core without adding metal to the weld.

2. The method of claim 1, wherein said controllably welding includes oscillating a welding torch in a plane substantially perpendicular to the length of the recuperator core.

3. The method of claim 1, further including grinding a top side of each of said pair of butterpasses extending along substantially the length of the plurality of core portions before said connecting the plurality of core portions.

4. The method of claim 1, further including grinding opposite side surfaces of each of said pair of butterpasses extending along substantially the length of the recuperator core after connecting the plurality of core portions.

5. The method of claim 1, wherein said attaching the air duct to the recuperator core includes attaching a one-piece air duct to the recuperator core.

6. The method of claim 1, wherein said welding a pair of butterpasses includes welding each of the pair of butterpasses at opposed sides of a longitudinal opening extending substantially the length of each of the plurality of core portions.

7. The method of claim 6, further including aligning the pair of butterpasses to extend substantially the length of the recuperator core.

8. The method of claim 6, further including aligning the longitudinal openings extending substantially the length of each of the plurality of core portions to form a longitudinal opening extending substantially the length of the recuperator core.

9. The method of claim 8, further including positioning a track at the longitudinal opening extending substantially the length of the recuperator core.

10. The method of claim 9, wherein said controllably moving a welding torch into the air duct includes moving the welding torch along the track.

11. The method of claim 9, further including grinding at least one side of each of said pair of butterpasses of the plurality of core portions by controllably moving a grinder along the track.

12. The method of claim 1, further including controllably moving a welding torch back through the air duct and along substantially the length of the recuperator core and controllably welding at least one additional metal-added weld along substantially the length of the recuperator core.

13. The method of claim 12, further including welding at least a portion of an exterior of a connection between the air duct and the recuperator core.

14. The method of claim 1, wherein said attaching the air duct to the recuperator core includes spot-welding the air duct to the recuperator core.

* * * * *